United States Patent Office 3,509,873
Patented May 5, 1970

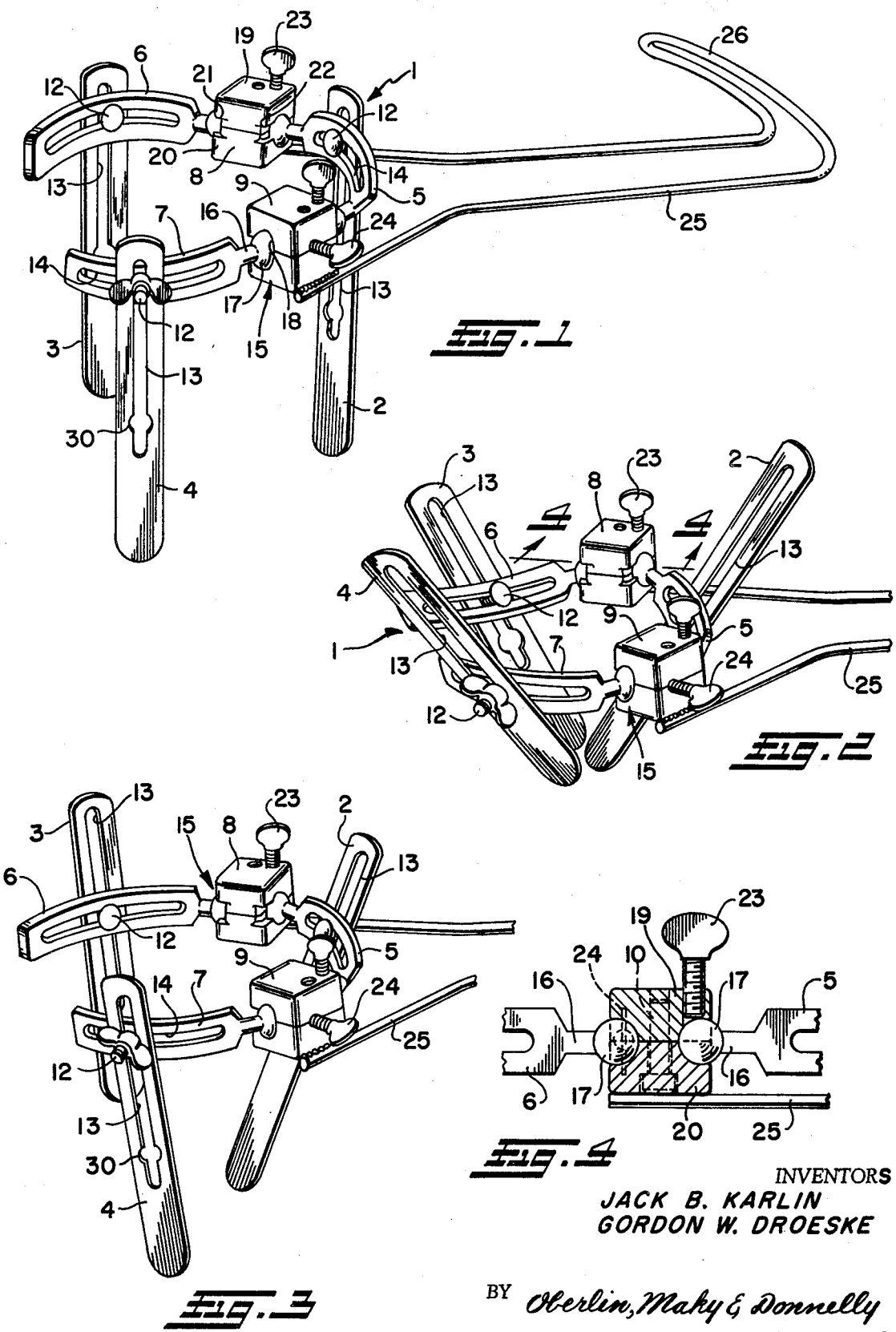

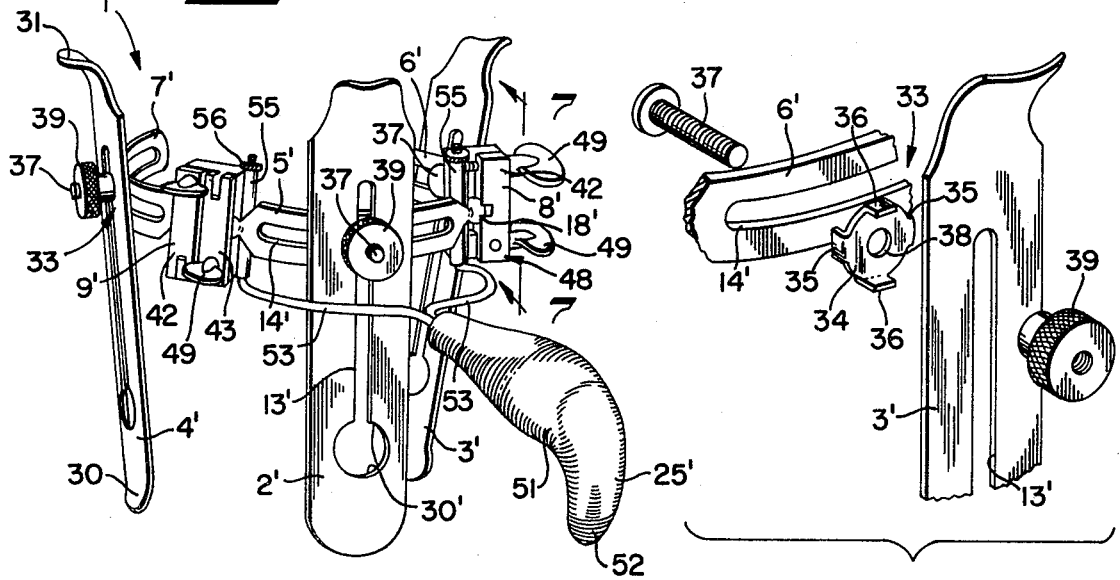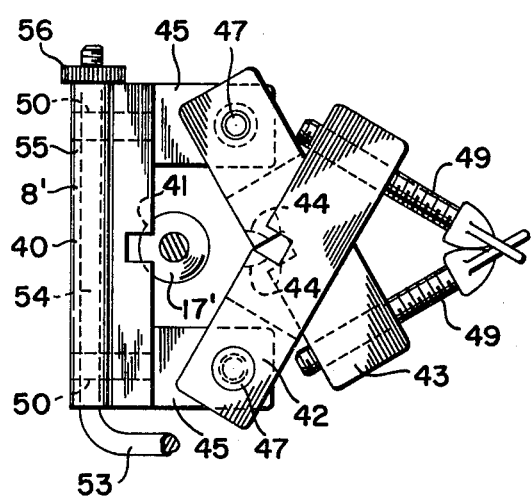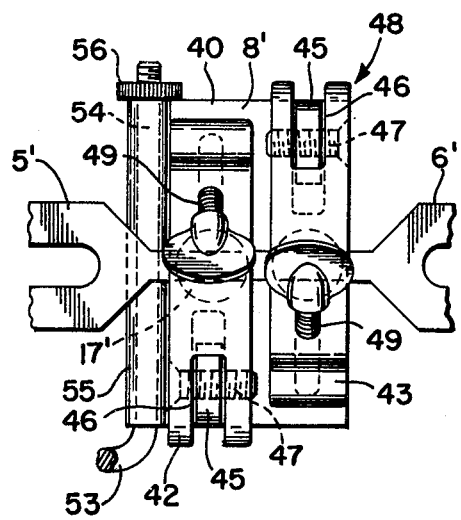

1

3,509,873
RETRACTOR
Jack B. Karlin, 35520 Vine St. and Gordon W. Droeske, 35574 Stevens Blvd., both of Eastlake, Ohio 44094
Continuation-in-part of application Ser. No. 547,546, May 4, 1966. This application Apr. 24, 1967, Ser. No. 634,424
Int. Cl. A61b 1/32
U.S. Cl. 128—17                    14 Claims

ABSTRACT OF THE DISCLOSURE

A retractor having a plurality of elongated blades which are carried by a corresponding number of blade support members in such a manner as to permit universal adjustment of the relative spacing, lengths, and angular positions of the blades with respect to each other.

CROSS-REFERENCE TO A RELATED APPLICATION

This application is a continuation-in-part of copending application Ser. No. 547,546, filed May 4, 1966, now abandoned, with Jack B. Karlin and Gordon W. Droeske as the inventors.

BACKGROUND OF THE INVENTION

This invention relates generally, as indicated, to a retractor especially of the type which is adapted to be used in abdominal surgery for drawing back the flesh around the edge of an incision in such a manner as to give better exposure or visibility and accessibility to the gall bladder or other organ on which surgery is to be performed.

There are several different types of surgical clamps or retractors in present use for drawing back a part or organ in an abdominal incision to better expose the gall bladder. However, such retractors must generally be held in position with two hands and the introduction of more than one into the incision is often necessary for proper exposure of the gall bladder. This leaves very little room in which the surgeon can manipulate safely, and moreover, such retractors are usually somewhat cumbersome to handle and difficult to adjust for varying the mount of organ exposure.

SUMMARY OF THE INVENTION

With the retractor disclosed herein, a wider or narrower field of exposure of and easy access to the gall bladder or other organ in the abdominal cavity to be operated on may be obtained, which is a principal object of the present invention. In general, this is accomplished by providing a retractor with a plurality of elongated blades which may be longitudinally adjusted to vary their relative lengths as well as laterally and angularly adjusted to vary their spacing and angular disposition with respect to each other, thereby permitting the retractor to be collapsed for easy insertion into an abdominal incision and subsequently adjusted to give the required exposure of the organ to be operated on.

Another object is to provide such a retractor which may be held in position by one hand of an assistant, thereby freeing the other hand to assist the surgeon.

Still another object is to provide such a retractor with a plurality of elongated blades and novel means for providing universal adjustment of the blades with respect to each other, whereby usually only one such retractor need be introduced into the abdominal cavity for complete exposure or visualization of the gall bladder.

A further object is to provide such a retractor in which the blades are of different lengths and novel means are provided for permitting the use of different sized blades depending on the size of the patient undergoing surgery.

2

Still another object is to provide such a retractor with a novel connection between the blades and associated blade support members for maintaining the desired angular relationship therebetween while permitting relative longitudinal and lateral adjustment of the blades.

Another object is to provide such a retractor with novel support blocks between the blade support members which permit universal adjustment of the blade support members and thus the blades with respect to each other.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but several of the various ways in which the principles of the invention may be employed.

BRIEF DESCRIPTION OF THE DRAWING

In such annexed drawing:

FIG. 1 is an isometric view of one form of retractor constructed in accordance with the present invention with the blades shown fully extended and spread apart as they might be in the final adjusted position in an abdominal incision;

FIG. 2 is an isometric view of the retractor of FIG. 1, but with the blades retracted and angularly disposed to provide a funnel shape to facilitate initial insertion into such abdominal incision;

FIG. 3 s still another isometric view of the retractor of FIG. 1, but with the blades partially extended and spread further apart than in FIG. 2;

FIG. 4 is an enlarged vertical section view through one of the retractor support blocks taken on the plane of the line 4—4 of FIG. 2;

FIG. 5 is an isometric view similar to FIG. 1 but of another form of retractor in accordance with this invention;

FIG. 6 is an exploded view showing the various parts of the connector for connecting the blades of the retractor of FIG. 5 to their respective support members in disassembled form;

FIG. 7 is an enlarged side elevation view of one of the support blocks of the retractor of FIG. 5 showing the clamping members swung away from the base member as seen from the plane of the line 7—7; and FIG. 8 is an outer end elevation view of the support block of FIG. 7.

DESCRIPTION OF THE PREFERRED EMBODIMENTS

Referring now in detail to the drawing and first especially to FIG. 1, there is shown one form of retractor in accordance with this invention which is generally indicated at 1 and consists of a plurality of elongated blades 2, 3 and 4 each carried by an arcuate blade support member 5, 6 and 7. A pair of support blocks 8 and 9 interconnect the outer blade support members 6 and 7 with the intermediate blade support member 5. The blades 2, 3 and 4 may be attached to their respective support members 5, 6 and 7 as by means of wing nuts 12 or the like extending through longitudinal slots 13 in the blades, whereby upon loosening of the wing nuts 12, the effective length of the blades extending below the blade support members 5, 6 and 7 may be adjusted as desired. Such wing nuts 12 also preferably extend through elongated slots 14 in the blade support members 5, 6 and 7 to permit lateral adjustment of the blades 2, 3 and 4 longitudinally along the support members.

In addition to the permissible longitudinal and lateral adjustment of the elongated blades 2, 3 and 4, the adjustment of their relative angular positions and spacing is made possible by a universal connection 15 between the support blocks 8 and 9 and support members 5, 6 and 7, which in the form shown in FIGS. 1–4 comprises a reduced extension 16 on the inner end portions of the support members 6 and 7 and on both end portions of the support member 5 with a ball 17 on each extension 16 received in sockets 18 in the support blocks 8 and 9. As perhaps best seen in FIG. 4, the support blocks 8 and 9 may be made in two parts 19 and 20 with cooperating half sockets milled in each part and held together by suitable fasteners 10 to facilitate assembly and disassembly of the balls 17 within the sockets 18. Moreover, the support blocks 8 and 9 have milled slots 21 and 22 through the inner corners of the blocks adjacent the sockets 18 for receipt of the support member extensions 16 to permit substantial swinging in of the support member 6 and 7 and support blocks 8 and 9. For locking the various support members 5, 6 and 7 and support blocks 8 and 9 in any desired adjusted position, set screws 23 and 24 are threaded into the top and outer side of each block for engagement with the balls 17. All of these parts, the blades 2, 3 and 4, support members 5, 6 and 7, and support blocks 8, 9 and 10 are made of stainless steel or similar type metal to reduce corrosion.

The retractor 1 is held by a wire handle 25 which is in the form of a loop having extensions attached to the support blocks 8 and 9 as by welding, and the loop 26 of the handle 25 is bent over for engagement by the side of the hand to facilitate holding thereof. Of course, the handle 25 must be rigid enough to support the retractor 1 and yet be sufficiently flexible to permit relative movement between the support blocks 8 and 9 as necessitated by adjustment.

The retractor 1 as described above has particular utility in abdominal surgery, it being especially designed to draw back the flesh and organs around the edge of an incision for complete exposure and ready accessibility to the gall bladder. To facilitate initial insertion of the blades 2, 3 and 4, the wing nuts 12 and set screws 23 and 24 are loosened so that the blades may be retracted and the blade support members 5, 6 and 7 pivoted in such a manner as to dispose the blades at an angle in the shape of a funnel, similar to that illustrated in FIG. 2 of the drawing. Once in, the blades 2, 3 and 4 are independently forced further into the incision with the back blade 2 preferably nearest the rib cage of the patient and the blades are progressively straightened and spread apart from the FIG. 2 position to the FIG. 3 position and finally to the FIG. 1 position. However, it should be understood that the final disposition of the blades 2, 3 and 4 may be varied as desired depending on the required amount of exposure of the gall bladder. Of course, as each support member 5, 6 and 7 and blade 2, 3 and 4 is adjusted, the set screws 23 and 24 and wing nuts 12 are tightened to lock the various parts of the retractor 1 in place.

Although the depth to which the blades 2, 3 and 4 is inserted into the incision may be varied, it is preferred that the blades be substantially completely extended as shown in FIG. 1 when in the final position so that the clothes of the surgeons and assistants will not be caught on the exposed blade ends. Accordingly, the blades 2, 3 and 4 are usually of different lengths with the back blade 2 the longest, up to a foot in length. Moreover, blades of different lengths may be substituted for those already on the retractor, depending on the size of the patient undergoing surgery, and for that purpose enlarged openings 30 may be provided in the blade slots 13 adjacent the lower ends thereof for easy removal and attachment of the blades 2, 3 and 4 to their respective support members 5, 6 and 7. Although three such blades are shown, it should be understood that more blades with associated support members and support blocks could be provided without departing from the present invention.

The lower ends of the blades 2, 3 and 4 are rounded and the blades are an inch or more wide to minimize the possibility of tearing the liver and damaging the intestines by the blades. Moreover, the set screws 23 and 24 are threaded into the top and outer sides of the support blocks 8 and 9 as aforesaid and the wing nuts 12 extend outwardly from the blades to give the surgeon as much room as possible in which to operate. In addition, once the retractor is in position, it may be held by grasping the handle 25 with one hand of an assistant, thus freeing the other hand to assist the surgeon and freeing both hands of the surgeon to perform the required surgery.

In FIGS. 5–8 there is illustrated another form of retractor 1' constructed in accordance with the present invention which is similar in many respects to the retractor 1 of FIGS. 1–4 already described, and accordingly the same reference numerals followed by a prime symbol (') are used to designate like parts. For example, the retractor 1' like the retractor 1 consists of a plurality of elongated blades 2', 3' and 4' each carried by an arcuate blade support members 5', 6' and 7'. Moreover, the blades 2', 3' and 4' are slightly arcuate in section transverse to their longitudinal areas as are the blades 2, 3, and 4 to conform to the blade support members 5', 6' and 7' which are arcuate in the longitudinal direction for ease of sliding of the blades therealong and maintaining the blades substantially perpendicular with respect to the support members. However, the lower ends 30 of the blades 2', 3' and 4' rather than being straight, are bent outwardly to a slight extent, whereby they are less traumatic to any organ that they come into contact with during insertion of the blades into an incision, and the upper ends 31 of such blades are also bent outwardly but to a greater extent so that they may be readily grasped by the surgeon or his assistant to facilitate adjustment of the blades.

Although the complementary curvatures of the blade support members 5, 6 and 7 and associated blades 2, 3 and 4 of the retractor 1 may be adequate to maintain the blades generally perpendicular to the support members when the wing nuts 12 are tightened, such orientation of these parts is assured by using connectors 33 therebetween. As perhaps best seen in FIG. 6, such connectors 33 consist of a washer 34 disposed between the support members 5', 6' and 7' and associated blades 2', 3' and 4' and having a first pair of inwardly directed diametrically opposite tabs 35 which are received in the slots 14' of the support members 5', 6' and 7' and a second pair of outwardly directed diametrically opposite tabs 36 oriented 90° with respect to the tabs 35 and received in the longitudinal slots 13' of the blades 2', 3' and 4', thereby permitting relative longitudinal movement of the support members and blades with respect to each other but not relative angular movement. Screws 37 extending outwardly through the aligned slots 13', 14' and passing through central openings 38 in the washers 34 have knurled nuts 39 threadedly engaging their outer ends which when tightened hold the blades in any desired longitudinally adjusted position. Enlarged openings 30' adjacent the lower ends of the blade slots 13' of a diameter slightly greater than the nuts 39 permit ready removal and attachment of the blades 2', 3', and 4' as desired.

All of the blade support members 5', 6' and 7' illustrated have the same general arcuate configuration. However, it should be understood that any or all of such support members could be of different configurations and of different lengths. For example, the intermediate blade support member 5' may be curved as shown and the other support members 6', 7' may be substantially straight, a configuration especially useful in intra vaginal surgery.

The support blocks 8' and 9' interconnect the outer blade support members 6' and 7' with the intermediate blade support member 5' in a manner generally similar to the support blocks 8 and 9 shown in FIGS. 1–4, each being provided with a pair of sockets 18' for receipt of the balls 17' on the inner ends of the support members 6' and 7' and on both ends of the support member 5'. However, the manner in which the balls 17' are locked in place is different. As clearly shown in FIGS. 7 and 8, the support blocks 8' and 9' each consist of a base member 40 having a pair of half sockets 41 milled therein and a pair of clamping members 42, 43 separately pivotally mounted on each base member 40 adjacent opposite ends thereof. Each clamping member 42, 43 has a half socket 44 milled therein which cooperates with one or the other of the half sockets 41 in the base member 40 to provide the sockets 18' for the balls 17' as aforesaid. Ears 45 project outwardly from the base member 40 into slots 46 in the clamping members 42, 43 with screws 47 extending through aligned openings in the walls of the slots 46 and ears 45 to establish the desired pivotal connections 48.

Extending through the ends of the clamping members 42, 43 remote from the pivotal connections 48 are wing nuts 49 which are threadedly received in tapped openings 50 in the base member 40 to provide a mechanical advantage as the nuts 49 are tightened forcing the clamping members 42, 43 into tight locking engagement with the balls 17' thus securely maintaining the various support members 5', 6' and 7' and support blocks 8' and 9' in adjusted position.

The handle 25', rather than being made entirely out of wire as in the FIG. 1 embodiment, has a rigid gripping portion 51 of wood, plastic, or other similar material preferably with a downwardly curved outer end portion 52. Extending from the inner end of the gripping portion 51 is a pair of oppositely outwardly bowed wire portions 53 whose outer ends 54 may be bent at right angles for insertion through sleeve portions 55 carried by the base member 40 to connect the handle 25' to the support blocks 8' and 9'. The wire end portions 54 extend all the way through the sleeve portions 55 and have knurled nuts 56 threaded on the exposed ends thereof for releasably locking the support members and handle together. Otherwise, the construction and operation of the retractor 1' is substantially the same as the retractor 1 and accordingly no further discussion of the same is thought to be necessary.

From the above discussion, it can now be seen that the various forms of retractors of the present invention are of a unique construction which permits them to be readily inserted into an abdominal incision and adjusted for complete exposure of the gall bladder or other such organ without damaging or tearing other organs and flesh. Moreover, the retractors may be readily modified for use with different sized patients, and may easily be held by one hand of an assistant, thus freeing the other hand to assist the surgeon and freeing both hands of the surgeon.

We therefore, particularly point out and distinctly claim as our invention:

1. A surgical retractor comprising a plurality of elongated blades having longitudinal axes, a plurality of support members for said blades, said support members having end portions, means mounting said blades on said support members for longitudinal movement of said blades with respect to said support members, and means interconnecting said support members for permitting limited relative movement of said support members with respect to each other, said support members having longitudinal axes, and means for permitting movement of said blades along the longitudinal axes of said support members, selected ones of said support members being arcuate in the longitudinal direction and the associated blades being similarly arcuate in section transverse to their longitudinal axes to permit ready sliding of said blades both longitudinally along and transversely of said support members while maintaining said blades substantially perpendicular with respect to their associated support members.

2. A surgical retractor comprising a plurality of elongated blades having longitudinal axes, a plurality of support members for said blades, said support members having end portions, means mounting said blades on said support members for longitudinal movement of said blades with respect to said support members, means interconnecting said support members, said means mounting said blades on said support members for longitudinal movement of said blades comprising longitudinal slots in said blades, and fastener means for attaching said blades to said support members through said longitudinal slots, said support members also having longitudinal axes, longitudinal slots in said support members, said fastener means passing through said slots in both said support members and blades to permit adjustment of said blades along said longitudinal slots in said support members, said fastener means comprising a washer disposed between each of said support members and associated blades, each said washer having a first pair of projecting tabs which are received in the slot in the associated support member and a second pair of projecting tabs oriented 90° with respect to said first pair of tabs and extending in the opposite direction which are received in the slot in the associated blade, thereby precluding relative angular movement of said blades with respect to their associated supoprt members, and means for holding said support members, blades, and washers together.

3. The retractor of claim 2 wherein said last-mentioned means comprises a screw extending outwardly through the aligned slots in each of said support members and blades and passing through a central opening in each of said washers, and a nut threadedly engaging the outer end of each said screw which when tightened holds said blades in adjusted position.

4. A surgical retractor comprising a plurality of elongated blades having longitudinal axes, a plurality of support members for said blades, said support members having end portions, means mounting said blades on said support members for longitudinal movement of said blades with respect to said support members, and means interconnecting said support members through selected end portions of said support members for permitting limited universal movement of said support members with respect to each other including support blocks between said selected end portions of said support members, balls on said selected end portions, and sockets in said support blocks for receipt of said balls, and a handle for supporting said retractor, said handle having a rigid gripping portion and a pair of opposite outwardly bowed wire portions projecting from said gripping portion, sleeve portions on two of said support blocks, said wire portions having outer ends which are bent for receipt in said sleeve portions and extending therthrough, and nuts threaded onto the ends of said bent wire portions extending through said sleeve portions.

5. A surgical retractor comprising a plurality of elongated blades having longitudinal axes, a plurality of support members for said blades, said support members having end portions, means mounting said blades on said support members for longitudinal movement of said blades with respect to said support members, and means interconnecting said support members through selected end portions of said support members for permitting limited universal movement of said support members with respect to each other including support blocks between said selected end portions of said support members, balls on said selected end portions, and sockets in said support blocks for receipt of said balls, each of said support blocks consisting of a base member having a pair of half sockets formed therein, a pair of clamping members pivotally mounted to said base member and having half sockets therein which cooperate with said half sockets in said base members to define said sockets for said balls, and screw means for urging said clamping members toward said base member into tight clamping engagement with said balls in said sockets to maintain the associated support member in adjusted position.

6. The retractor of claim 5 wherein said screw means in said clamping members are spaced further from the pivotal connections for said clamping members than said half sockets therein, whereby there is a mechanical advantage in clamping said balls as aforesaid.

7. A surgical retractor comprising a plurality of elongated blades having longitudinal axes, a plurality of support members for said blades, said support members having end portions, means mounting said blades on said support members for longitudinal movement of said blades with respect to said support members, and means interconnecting selected end portions of said support members for permitting limited universal movement of said support members with respect to each other, there being three of said blades and support members, said means mounting said blades on said support members for longitudinal movement of said blades comprising longitudinal slots in said blades, and fastener means for attaching said blades to said support members through said longitudinal slots, said fastener means also extending through longitudinal slots in said support members to permit lateral shifting of said blades along said longitudinal slots in said support members, said means mounting said blades for universal movement comprising support blocks between both end portions of one of said support members and the adjacent end portions of the other two support members, balls formed on such end portions of said support members, and sockets in said support blocks for receipt of said balls, said support blocks comprising a base member having a pair of half sockets formed therein, a pair of clamping members pivotally mounted to said base member and having half sockets therein which cooperate with said half sockets in said base member to define said sockets for said balls, and screw means for urging said clamping members toward said base member into tight clamping engagement with said balls in said sockets to maintain the associated support member in adjusted position, and a handle attached to said support blocks for supporting said retractor while permitting relative adjustment of said support blocks.

8. A surgical retractor comprising a plurality of elongated blades having longitudinal axes, a plurality of support members for said blades, said support members having end portions, means mounting said blades on said support members for longitudinal movement of said blades with respect to said support members, and means interconnecting selected end portions of said support members for permitting limited universal movement of said support members with respect to each other, said support members including an intermediate support member and two additional support members having end portions adjacent opposite end portions of said intermediate support member, said means mounting said support members for permitting limited universal movement with respect to each other comprising support blocks between the adjacent end portions of said additional support members and intermediate support members, balls on said adjacent end portions of said additional support members and intermediate support member, and sockets in said support blocks for receipt of said balls.

9. The retractor of claim 8 wherein said support blocks are made in two parts with cooperating half sockets in each part to facilitate assembly and disassembly of said balls within said sockets, and set screws are threaded in said support blocks for engagement with said balls to lock said support members in any desired adjusted position.

10. The retractor of claim 8 wherein said support members adjacent said balls have reduced extensions and said support blocks have slots therein for receipt of said extensions to permit substantial swinging of said support members and support blocks.

11. The retractor of claim 8 further comprising a handle attached to said support blocks for supporting said retractor while permitting relative adjustment of said support blocks.

12. The retractor of claim 11 wherein said handle has a rigid gripping portion and a pair of oppositely outwardly bowed wire portions projecting from said gripping portion, and means for securing said wire portions to said support blocks, said wire portions being rigid enough to support said retractor and yet sufficiently flexible to permit relative adjustment of said support blocks.

13. The retractor of claim 11 wherein said handle is in the form of a wire loop having extensions attached to said support blocks, said handle being rigid enough to support the retractor and yet sufficiently flexible to permit relative adjustment of said support blocks.

14. The retractor of claim 13 wherein said wire loop is bent over for engagement by the side of a hand to facilitate holding thereof.

References Cited

UNITED STATES PATENTS

| | | | |
|---|---|---|---|
| 475,975 | 5/1892 | Clough | 128—17 |
| 1,707,689 | 4/1929 | Sloan | 128—20 |
| 1,747,799 | 2/1930 | Straus | 128—20 |
| 2,670,731 | 3/1954 | Zoll et al. | 128—20 |
| 2,863,444 | 12/1958 | Winsten | 128—20 |
| 3,038,468 | 6/1962 | Raeuchle | 128—20 |
| 3,168,093 | 2/1965 | Gauthier | 128—20 |

FOREIGN PATENTS

| | | |
|---|---|---|
| 1,235,135 | 5/1960 | France. |
| 468,959 | 11/1928 | Germany. |

RICHARD A. GAUDET, Primary Examiner

K. L. HOWELL, Assistant Examiner

U.S. Cl. X.R.

128—20